United States Patent [19]

O'Hara et al.

[11] Patent Number: 4,629,509

[45] Date of Patent: Dec. 16, 1986

[54] IMMOBILIZATION OF LEAD AND CADMIUM IN FLY ASH

[75] Inventors: Mark J. O'Hara, Mount Prospect; Peter Urban, Northbrook, both of Ill.

[73] Assignee: Allied Corporation, Morristown, N.J.

[21] Appl. No.: 748,367

[22] Filed: Jun. 24, 1985

[51] Int. Cl.⁴ .............................................. C04B 7/34
[52] U.S. Cl. .................................. 106/118; 106/900; 106/DIG. 1
[58] Field of Search ................. 106/DIG. 1, 118, 900; 423/DIG. 18

[56] References Cited

U.S. PATENT DOCUMENTS 4,226,630 10/1980 Styron .......................... 106/DIG. 1
4,501,618 2/1985 Gebhard ....................... 106/DIG. 1

OTHER PUBLICATIONS

EP Toxicity Test Results on Residues from Eight Recovery Facilities (Feb. 1981).
Separation Science and Technology, 14, 441–452 (1979), Chemical Abstracts, 92; 185414d (1980).

*Primary Examiner*—William R. Dixon, Jr.
*Assistant Examiner*—Steven Capella
*Attorney, Agent, or Firm*—Thomas K. McBride; John F. Spears, Jr.; Eugene I. Snyder

[57] ABSTRACT

Leaching of cadmium and lead from solid residues obtained in the incineration of refuse may be reduced to environmentally acceptable levels by the addition of calcium sulfide to such residues. A particularly convenient method involves the addition of dry lime and an aqueous solution of an inorganic salt supplying sulfide, especially an alkali metal sulfide, in equimolar quantities.

8 Claims, No Drawings

IMMOBILIZATION OF LEAD AND CADMIUM IN FLY ASH

BACKGROUND OF THE INVENTION

An increasing word population leads to a continually increasing amount of refuse. Additionally, an increased level of civilization appears to generate an increased amount of refuse on a per capita basis. Both factors in combination lead to mounting pressure to devise methods of waste disposal which are economically, energetically, and environmentally sound.

In recent years, especially in urban areas, the increased demand for usable land and other concerns has caused one to turn from a landfill as the major mode of refuse disposal to other options, especially the use of raw refuse as an energy source. One variant of the latter is the mass burning approach, where all the refuse in its raw state is burned without any preliminary treatment such as separating the noncombustible from combustible material. Quite briefly, in this method raw garbage is dumped into storage where it is homogenized and dried to some degree. Refuse from the storage area is fed into a combustion zone where the heated gases often are used to generate steam. Flue gases then pass from the combustion zone to a separation zone, often an electrostatic precipitator, where dust and ash are removed. The ash so removed from the flue gas, called fly ash is then mixed with the ash collected in the combustion zone, and the combined ash used for landfill, in road construction, and so forth.

It is well known that some of the more volatile compounds of certain metals tend to accumulate in the fly ash. Especially where the latter is to be used as landfill, leaching of toxic metals, especially cadmium and lead, constitutes a potential hazard to the ecosystem, for example, both surface water supplies and aquifers. The Environmental Protection Agency (EPA) has promulgated a procedure to determine the toxicity of solid wastes, and where residues exceed the toxicity as stated in the Federal Register Code 40, No. 26124, the waste is classified as a hazardous waste requiring control under the Hazardous Waste Management System. A recent report prepared for the Office of Solid Waste, U.S. Environmental Protection Agency, which was a limited survey of several kinds of solid waste, seems to suggest that levels of cadmium and lead in fly ash pose perhaps the most serious environmental threat, and that such fly ash alone would need to be treated as a hazardous waste. EP Toxicity Test Results on Residues from Eight Resource Recovery Facilities, SYSTECH Corporation, February, 1981.

The environmental hazard of fly ash containing amounts of cadmium and lead greater than the toxic levels specified by the EPA is somewhat diminished by mixing such ash with heavy ash, such that the resulting landfill mixture is within the toxic levels for the cited metals. Nonetheless, it is highly desirable to reduce the amount of cadmium and lead reched from fly ash and other solid waste to an amount below the toxic levels specified by the EPA. The invention herein is a solution to this problem. More specifically it is a method of treating dry, solid residues, especially fly ash, so as to reduce the amounts of cadmium and lead leached from such residues to a level below the toxic level specified by the EPA. Stated differently, the invention herein is a method of immobilizing, or insolubilizing, cadmium and lead in solid waste. The method is convenient, quite simple, very efficient, and relatively low cost. The method is, therefore, commercially extraordinarily attractive as well as being environmentally beneficial.

The precipitation of heavy metals, including cadmium and lead, as their sulfides is a well-known analytical technique. Removal of soluble cadmium and lead from waste water by precipitation of cadmium sulfide and lead sulfide following addition of sulfide ion has been described as an effective treatment. Bhattacharyya et al., *Separation Science and Technology*, 14, 441–52 (1979). Solid wastes containing cadmium and lead were treated with 3–15% calcium hydroxide and/or magnesium sulfate, the pH was adjusted to 8–10.5, and the solid coated with asphalt to prevent the leaching of cadmium and lead. *Chemical Abstracts*, 92; 185414d. The preceding method appears to be a mixture of coagulation-flocculation followed by encapsulation in a hydrophobic, petroleum-based solid.

The invention herein is based on the discovery that insolubilization of lead and cadmium in fly ash or similar dry solid residues is effectively brought about by the addition of small amounts of aqueous sulfide. A further discovery is that calcium sulfide is especially effective for the immobilization of lead and cadmium. A still further discovery is that treatment of fly ash and similar dry solid residues with dry lime followed by a solution of an alkali metal sulfide in an amount barely sufficient to moisten the solid refuse effectively simulates the action of calcium sulfide in immobilizing lead and cadmium.

SUMMARY OF THE INVENTION

The object of this invention is to immobilize cadmium and lead in dry, solid residues obtained from refuse burning. An embodiment comprises mixing the solid residue with calcium sulfide. In another embodiment the solid residue is mixed with approximately equal molar quantities of dry lime and an aqueous solution of an inorganic sulfide. Other objects and embodiments will be apparent from the following description.

DESCRIPTION OF THE INVENTION

The invention herein is a method of immobilizing toxic elements, especially cadmium and lead, in dry solid residues as are obtained in the burning of solid waste. In particular, it is a method of making such metals in the residues resistant to leaching so as to reduce subsequent contamination of the ecosystem. The solid residues which may be used in the practice of this invention are principally fly ash. However, other residues, such as heavy ash and other solids with unusually high levels of cadmium and/or lead, also can be used in the practice of this invention.

The solid residue is mixed with lime and an aqueous solution of a soluble inorganic sulfide. The temperature at which such mixing is performed is not critical. Thus, the method which is our invention may be successfully performed at ambient temperature, that is, a temperature between about 15° and about 40° C. More generally the residue is at a temperature above ambient, that is, at a temperature between about 50° and 75° C., and the method herein is equally well practiced under those conditions. The method also can be practiced either in the absence or presence of air. The presence of air is not deleterious so long as the oxidation of sulfide to, for example, thiosulfate is not a problem under the conditions of mixing. However, it has been found that in the presence of air, i.e., an oxidizing atmosphere, about twice as much immobilizing agent is needed as in the absence of air.

As stated previously, the solid residue is mixed with lime and an aqueous solution of a soluble inorganic sulfide. The lime is used in the dry state and generally is merely sprinkled on the solid residue and mixed well with it. It is somewhat advantageous to add the lime before adding the aqueous solution of the inorganic sulfide to prevent the formation of hydrogen sulfide where the residue is acidic, but the order of addition becomes unimportant where the residue is basic.

An aqueous solution of any soluble inorganic sulfide or an inorganic salt which supplies or furnishes sulfide in the basic environment resulting from the lime treatment, will suffice in the practice of this invention. Generally, alkali metal sulfides, hydrosulfides, and polysulfides will be used, especially sodium and potassium sulfide, because of their ready availability. However, other sulfides, hydrosulfides, and polysulfides may be used in the practice of this invention. Illustrative examples include ammonium sulfide, sodium hydrosulfide, polysulfides of sodium and potassium, and sulfides of the alkaline earth metals, such as magnesium and calcium. The use of calcium sulfide is unique, in that where it is used the addition of lime is not necessary. This arises because it has been found that calcium sulfide is particularly effective in immobilizing cadmium and lead. The concentration of sulfide in aqueous solution generally is not critical and any convenient concentration is acceptable. For example, where sodium or potassium sulfide is used solutions in the range from about 10% to about 15% by weight often are used. Sodium hydrosulfide or polysulfide may be used to increase the sulfide concentration above about 15% by weight.

Lime and inorganic sulfides are used in approximately equal molar quantities, which is to say a molar rtio between about 0.8 to about 1.2, as the most efficient mode of practicing this invention. However, it will be appreciated that one can readily deviate from equimolarity at the expense of a loss in efficiency, that is, no substantial benefit is derived from such deviation and one of the components will be underutilized.

The total amount of calcium sulfide used, or its equivalent as lime and an aqueous solution of the soluble inorganic sulfide, is that amount which is effective to reduce the leaching of cadmium and lead to a level less than that specified by the EPA, i.e., 5 ppm for lead and 1 ppm for cadmium. The total amount, therefore, depends upon the amount of cadmium and lead in the solid residue and may depend on the particular nature of the solid as well. For example, for a solid residue containing less than about 0.1% by weight cadmium approximately 3 wt. % relative to the total solid residue as calcium sulfide is sufficient.

The following examples merely illustrate and exemplify the practice of this invention which is not to be construed as being limited thereto in any way.

EXAMPLE 1

The following method, based on a modified EPA method as described in the Federal Register V. 45, No. 98, May 19, 1980, pp33099 et ff., was used to screen various methods. Experiments were performed by mixing an immobilizing material with 10 g dry fly ash in a 500 ml Erlenmeyer flask. Water (160 ml) was added and the mixture was agitated thoroughly on a wrist action shaker. After one hour the pH was recorded and adjusted to 5.0±0.2 by addition of 0.5N acetic acid. Agitation was continued with hourly adjustment of pH to 5.0±0.2 until a stable pH of 5.0 was reached or the maximum allowed (40 ml) 0.5N acetic acid was used. The total mixing time on the standard test was 24 hours. Solids were separated on a vacuum Millipore filter XX1004700 using an AP type prefilter and an HA type 0.45 micron fine filter. If less than 40 ml acetic acid was used, the final volume was adjusted with water. Ultrapure concentrated nitric acid in an amount of 1 ml per 100 ml leachate was added after filtration to stabilize the solution.

The modified EPA toxicity reference test itself is carried out without the addition of immobilizing material. Levels of cadmium and lead in leachate were determined by atomic absorption. Results are summarized in the accompanying table. Fly ash was obtained from a commercial refuse burning facility.

TABLE 1

Immobilization of Lead and Cadmium in Fly Ash

| Test | Immobilizing Agent (% by weight) | pH initial | pH final | Extract, ppm Pb | Extract, ppm Cd |
|---|---|---|---|---|---|
| 1 | None | 12.0 | 6.1 | 6.8 | 9.4 |
| 2 | 1% CaS | 12.0 | 6.4 | 0.87 | 0.41 |
| 3 | 1% Na$_2$S | 12.4 | 6.4 | 8.9 | 4.2 |
| 4 | 1% CaO | 12.5 | 6.4 | 3.9 | 10.0 |
| 5 | 1.08% Na$_2$S + 0.78% CaO (1.0% CaS equivalent) | 12.6 | 7.0 | 5.5 | 3.8 |
| 6 | 1.9% CaS | 12.0 | 7.2 | 0.55 | 0.017 |
| 7 | 1.9% Na$_2$S | 12.5 | 7.0 | 6.6 | 2.8 |
| 8 | 1.9% CaO | 12.7 | 7.0 | 1.4 | 9.2 |
| 9 | 2.16% Na$_2$S + 1.56% CaO (2.0% CaS equivalent) | 12.7 | 8.3 | 0.72 | 0.33 |

These results show the outstanding immobilization of lead and cadmium by calcium sulfide. They also show that about 2 equivalents of calcium sulfide are needed from sodium sulfide and calcium oxide to operationally equal 1 equivalent of calcium sulfide itself.

EXAMPLE 2

Pilot plant operations were performed by charging a mixture of fly ash and lime into a mixing chamber which was a cylinder 24" (61.0 cm) long by 3.08" (7.82 cm) inside diameter inclined at 23° and maintained in a temperature chamber. Liquid was sprayed or dripped onto the fly ash-lime mixture at their entrance to the chamber, with the average residence time of materials in the chamber being about 15 minutes. Samples ere taken after approximately 0.5-1 hour of operation to ensure equilibrium. Some results are shown in Table 2. The runs under nitrogen were at a temperature of 16°-19° C., and that in air at 17°-19° C., both being external chamber temperatures.

TABLE 2

Immobilization of Fly Ash Under Nitrogen

| Charge Rate | Control | Run 1 | Run 2 | Run 3 | Run 4 |
|---|---|---|---|---|---|
| Ash, g/hr |  | 373 | 479 | 495 | 401 |
| Na$_2$S, g/hr |  | 13.4 | 10.7 | 15.9 | 16.4 |
| CaO, g/hr |  | 8.7 | 11.2 | 11.6 | 9.4 |
| N$_2$, cubic ft/hr |  | 2.0 | 0.98 | 1.72 |  |
| Air, cubic ft/hr |  |  |  |  | 1.87 |
| % CaS, equivalent |  | 3.0 | 2.1 | 3.0 | 3.0 |
| % excess Na$_2$S |  | 0.37 |  | 0.02 | 0.79 |
| % excess CaO |  |  | 0.72 |  |  |
| Metals content after treatment, ppm |  |  |  |  |  |
| Pb | 42 | 2.4 | 13.5 | 1.6 | 1.82 |

TABLE 2-continued

| | Immobilization of Fly Ash Under Nitrogen | | | | |
|---|---|---|---|---|---|
| | | Run | | | |
| Charge Rate | Control | 1 | 2 | 3 | 4 |
| Cd | 18 | 0.34 | 9.8 | 0.11 | 1.78 |

These results show generally the effectiveness of the equivalent of 3% CaS in reducing the levels of leachable lead and cadmium from fly ash. They also show that in the presence of air immobilization of cadmium is reduced. However, other results not reproduced here suggest that doubling the CaS equivalent will reduce cadmium levels to those found upon immobilization under nitrogen using 3.0% CaS equivalents.

What is claimed is:

1. A method of immobilizing cadmium and lead in a dry solid residue obtained from the burning of solid wastes comprising mixing said residue with an amount sufficient to reduce the leaching of cadmium to a level less than about 1 ppm and of lead to a level less than about 5 ppm of approximately equimolar proportions of lime and an aqueous solution of a soluble inorganic salt supplying sulfide.

2. The method of claim 1 where the solid residue is fly ash.

3. The method of claim 1 where the inorganic salt is an inorganic sulfide.

4. The method of claim 3 where the sulfide is an alkali metal sulfide.

5. The method of claim 4 where the sulfide is sodium sulfide.

6. The method of claim 3 where the inorganic sulfide is an alkaline earth metal sulfide.

7. The method of claim 1 where the inorganic salt is an alkali metal sulfide, alkali metal polysulfide, or alkali metal hydrosulfide.

8. A method of immobilizing cadmium and lead in a dry solid residue obtained from the burning of solid wastes comprising mixing said residue with calcium sulfide in an amount effective to reduce leaching of cadmium to a level less than about 1 ppm and of lead to a level less than about 5 ppm.

* * * * *